United States Patent [19]

Billeaudeaux

[11] Patent Number: 4,692,936
[45] Date of Patent: Sep. 8, 1987

[54] METHOD AND APPARATUS FOR RADIOGRAPHIC INSPECTION

[76] Inventor: James K. Billeaudeaux, 100 Bon Wier La., Lafayette, La. 70506

[21] Appl. No.: 617,126

[22] Filed: Jun. 4, 1984

[51] Int. Cl.$^4$ .................... G01B 15/06; H05G 1/28
[52] U.S. Cl. ...................................... 378/59; 378/163
[58] Field of Search ................................ 378/57–59, 378/162, 163, 164

[56] References Cited

U.S. PATENT DOCUMENTS

| | | | |
|---|---|---|---|
| 1,553,229 | 9/1925 | Fraser | 378/163 |
| 2,650,308 | 8/1953 | Catlin | 378/163 |
| 3,001,070 | 9/1961 | Davis et al. | 378/164 |
| 3,088,027 | 4/1963 | Graham | 378/59 |
| 3,521,059 | 7/1970 | Stolle | 378/59 |
| 3,812,842 | 5/1974 | Rodriguez | 378/163 |
| 3,913,561 | 9/1975 | Maeda | 378/164 |

FOREIGN PATENT DOCUMENTS 0003034  1/1982  Japan ........................................ 378/59

*Primary Examiner*—Janice A. Howell

[57] ABSTRACT

A process and apparatus for measuring pipe wall thickness wherein a film sheath is placed beneath the pipe section to be inspected and a radiographic stream is projected from a camera through the pipe to the film pack. Gamma radiation is exemplary in this process. There is further provided a comparative scale which comprises a scale portion, normally constructed of brass or the like material having a plurality of cuts through the scale body representing a scale in twenty thousands of an inch (0.20 inches) increments. This scale body, for purposes of enabling accurate radiography, is encased between an upper and lower layers of carbon steel or other material, the entire layer being encased in a plastic or the like encasement sheath. During the process, the comparative scale is placed adjacent the area of pipe to be radiographed. Following the radiographing of the pipe and comparative scale, the resulting graphic produced indicates the pipe thickness adjacent the comparative scale. Therefore, a simple calipar measurement of the pipe wall set against the divisions of the scale, which are a constant factor, enable one to have an exact reading of the pipe wall thickness as compared against the reading on the scale.

10 Claims, 9 Drawing Figures

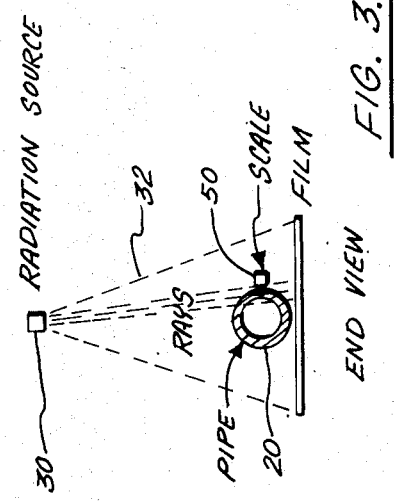
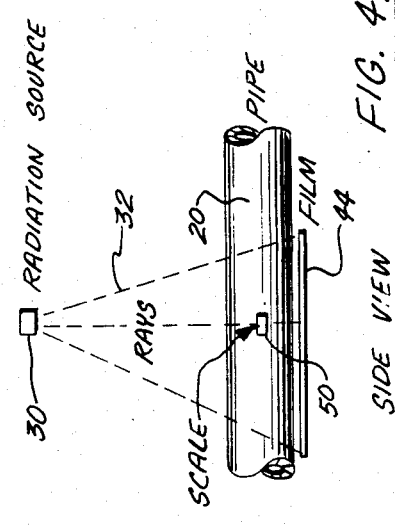
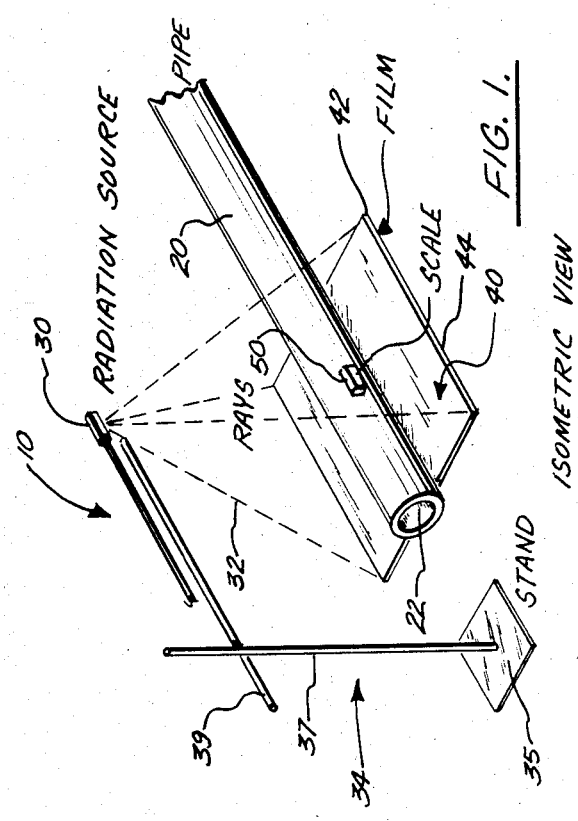
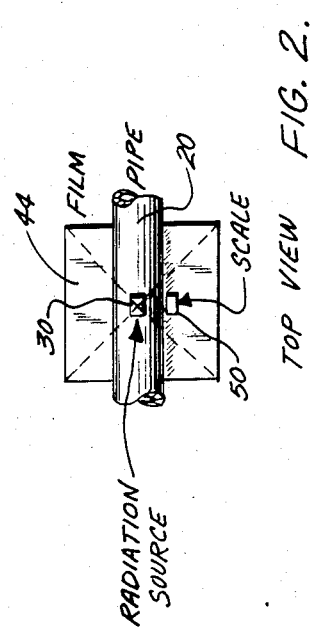

METHOD AND APPARATUS FOR RADIOGRAPHIC INSPECTION

BACKGROUND OF THE INVENTION

1. Field of the Invention

The present invention relates to radiographic industrial inspection such as the radiographic inspection of pipe; and more particularly the invention relates to the radiographic inspection of pipe as in erosion/corrosion control, wherein the pipe or pipe joint is radiographically reproduced on film and the wall erosion is measured against a constant factor.

2. General Background

In the chemical, refinery, oil and gas and other such industries, which utilize pipe for the conveying of a variety of liquid and gaseous materials as well as solid materials in slurry form, during the transport of these materials in the pipe, pipes are frequently subjected to mechanical erosion and corrosion within, based upon the materials which they convey.

In the art of corrosion and erosion control it is often desirable to inspect these installed pipes on a periodic basis in order to determine whether or not wear has occurred which would jeopardize a safe operation. The erosion would normally occur in critical points of the pipe, such as elbow joints or "T" joints, wherever fluid contact being transported is most severe and thus would cause erosion of the pipes inner wall. Extensive wear on piping can produce dangerously thin pipe wall thickness which could result in a fracture or rupture of the pipe and resulting in some cases a catastrophy, such as a fire or explosion.

The radiographic art has developed a system for inspecting pipe which normally involves the use of radiation which is transmitted at the pipe to be inspected with a film pack having X-ray film therewithin being placed under the pipe opposite the ray producing camera so that a representation of the pipe is produced onto the X-ray film.

The use of radiography for inspecting pipe as well as numerous pipe fittings attached to the pipe is often done using typically a cassette which contains a sheet of X-ray film and usually two screens placed on each side of the film. The result of this type of X-ray procedure produces a representation on the X-ray film which must be placed against an illuminated background of light in order to be read and interpreted.

In the present state of the art, using known systems, technicians attempt to interpret the thickness of the pipe from the representation of the X-ray with the use of calipers or other measuring tools and in many instances using a known control element in the same exposure, such as a magnet, for example, attached to the side of the pipe. The magnet, or perhaps other objects such as a shim or metal block of known thickness is then measured in comparison to the distance from the X-ray source from which the pipe was X-rayed. This system falls short, in view of the fact that often the edges of the magnet or shim used become blurred, and it becomes increasingly difficult to measure with exactness to the comparison factor. Also, if the distance from the pipe has been inaccurately determined, an error in the comparison reading would occur.

GENERAL DISCUSSION OF THE PRESENT INVENTION

The apparatus and process of the present invention would solve the problems confronted in the present state of the art by providing a method and apparatus which can be utilized in the radiographic inspection of pipe and enable one to determine with exactness the thickness of the pipe wall and, therefore, the amount of erosion which has occurred in the pipe wall.

The system would include, as in the normal radiographic techniques, placing a radiographic film pack having therein a sheet of radiographic film upon which an image will be produced, the sheet of radiographic film being normally sandwiched between a pair of screens or the like and photographic film being enclosed within a film cassette. The film cassette is placed beneath the pipe section to be inspected and a radiographic stream is projected from a camera through the pipe to the film pack. Gamma radiation is exemplary in this process. There is further provided a comparative scale which comprises a scale portion, normally constructed of brass or the like material having a plurality of cuts through the scale body representing a scale in twenty thousands of an inch (0.20 inches) increments. This scale body, for purposes of enabling accurate radiography, is encased between an upper and lower layers of carbon steel or other material, the entire layer being encased in a plastic or the like encasement sheath. During the process, the comparative scale is placed adjacent the area of pipe to be radiographed. Following the radiographing of the pipe and comparative scale, the resulting graphic produced indicates the pipe thickness adjacent the comparative scale. Therefore, a simple caliper measurement of the pipe wall set against the divisions of the scale, which are a constant factor, enable one to have an exact reading of the pipe wall thickness as compared against the reading on the scale. Therefore, the problems confronted with the bluring of the magnet edges or the like are eliminated and the question as to the distance from the pipe is eliminated and a very accurate reading of the pipe wall against the scale increments is accomplished.

Therefore, it is an object of the present invention to provide a process for radiographing and accurately determining pipe wall thickness.

It is a further object of the present invention to provide a process for accurately determining pipe wall thickness without the use of conversion formulas or the like.

It is still a further object of the present invention to provide a process and apparatus for accurately measuring pipe wall thickness with the use of radiography by comparison of the thickness as measured against a known factor or scale.

BRIEF DESCRIPTION OF THE DRAWINGS

FIG. 1 is an overall view of the apparatus utilized in the process of the present invention;

FIG. 2 is a top view of the apparatus as utilized in the process of the present invention;

FIGS. 3 and 4 are end and side views respectively of the apparatus used in the process of the present invention;

FIGS. 5, 6 and 7 are views of the placement of a comparative scale in radiographing various types of pipe joints or the like;

DETAILED DESCRIPTION OF THE PREFERRED EMBODIMENT

Figure 6:
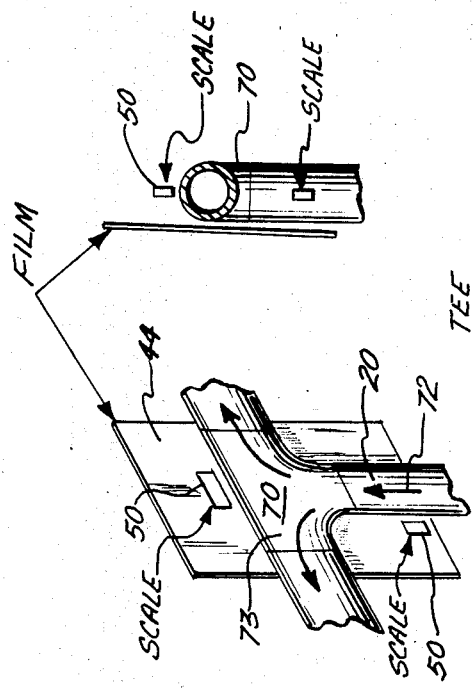

FIGS. 1 through 4 represent various views of the preferred embodiment of the apparatus of the present invention designated generally by the numeral 10 that is used in the present process. In particular, FIG. 1 represents an overall perspective view of the preferred embodiment of the apparatus number 10. In FIG. 1 there is seen a section of pipe 20 to be radiographically inspected. Pipe section 20 is normally circular in shape, but it should be understood that the present invention could be used to inspect a variety of differing pipe shapes including fittings, such as elbows, tees, and the like, and in addition any type of container or the like, which one would normally wish to determine what the thickness of the wall would be. Pipe section 20 would normally have a bore 22 therethrough which would convey during operation, any of a number of desired products including fluids, liquids, gases, slurries and the like.

It is further illustrated in FIG. 1, a radiographic source 30, which would be a source of rays such as gamma radiation directed in a desired path towards pipe 20, the gamma radiation schematically illustrated by the phantom lines 32 in FIG. 1. In the preferred embodiment, radiation source 30 would be supported by an adjustable stand 34, having a base member 35, a vertical stand member 37, a horizontally disposed member 39, upon which source 30 would be supported above pipe 20. As further illustrated in FIG. 1, there is provided film pack 40 which, in the preferred embodiment would include an outer cassette or the like 42 with a film sheet 44 disposed therebetween. As further illustrated in FIGS. 1 through 4, there is further provided a comparative scale means 50, which is located adjacent to the wall pipe to be radiographed, and in the path of the gamma radiation stream 32 as seen in FIG. 1, so that radiography of the pipe would likewise produce a radiographic rendering of the comparative scale 50. The components and functioning of the comparative scale will be provided further.

FIGS. 2 through 4 illustrate the top, end and side views respectively of the preferred embodiment of the apparatus during the radiographic technique. As seen in top view, the radiation source 30 is placed directly above pipe 20 during the process with comparative scale 50 adjacent the wall pipe 20, and radiographic film 44 directly beneath pipe 20 so that the central portion of pipe 20 to be radiographed is set directly above the center of film 44. Likewise, the end and side views, it should be noted that scale 50 is located directly intermediate the top and bottom portion of pipe 50 so that upon the radiography producing a graphic of the pipe and scale, the scale 50 has been located directly intersecting a cross section of pipe 20, in view of the fact that the radiographic reproduction of pipe 20 will reproduce a cross section of the pipe wall across its center and, therefore, the radiographic reproduction of scale 50 shall also be at that same level of the pipe wall being radiographed. This is necessary to achieve a radiograph of the pipe 20 and scale 50 at the same distance form the radiation source 30.

Figure 5:
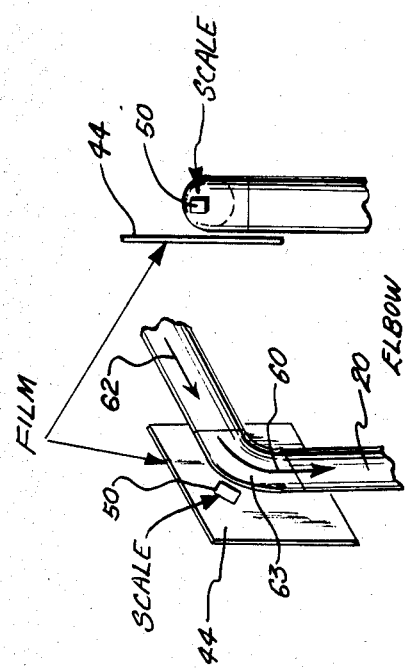
Figure 7:
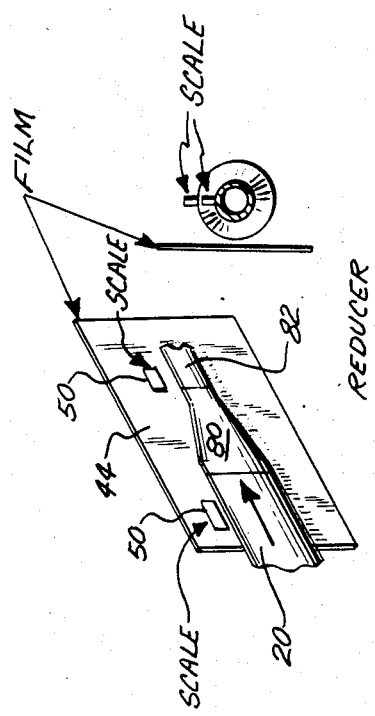

Turning now to FIGS. 5 through 7, there is illustrated the positioning of scale 50 and film layer 44 during the radiographing various type joints or sections as illustrated in the figures. For example, turning particular to FIG. 5, there is illustrated the radiographing of an elbow joint 60 of section of pipe 20, with the flow in pipe 20 as illustrated by arrow 62. It should be noted that as illustrated, scale 50 is placed on the upper most curvature wall 63 of elbow joint 60. This is so in view of the fact that the fluid flow 62 through elbow joint 60 would have the most severe contact with wall 63 of elbow joint 60; in view of the fact that the flow would, in effect, make contact with that wall prior to being directed into the lower most portion of pipe 20 past the elbow. Therefore, one would wish to obtain a thickness determination of wall 63 since that is the wall that would undergo the most severe erosion during the use of fluid flow through the pipe.

Likewise, as seen in FIG. 6, there is illustrated the radiographing of a "T" joint 70, which is in effect a joint of three sections of pipe at a single point with the flow of fluids as seen by arrow 72 upward into "T" joint 70 through lower pipe 20. As is illustrated in the FIGURE, scale 50 is placed on the upper most wall 73 of joint 70 in view of the fact that the upward fluid flow 72 would make the most severe contact with wall 73 and likewise, that would be the point of the most severe erosion of that particular type of joint. With the film 44 placed in the position as such, a radiographic rendering of joint 70 and scale 50 would show the wall 73 adjacent the scale and, thus a proper reading would be had. In the cross section view in FIG. 6 of joint 70, scale 50 is placed again across the center line of joint 70, since that is the point of the wall that would be properly rendered in the radiograph and, likewise, scale 50 would be at the proper position for equal rendering. There is also illustrated in FIG. 6 a second scale 50 which is positioned on the lower most section of "T" joint of pipe 20 leading to the lower most portion of "T" joint 70. This illustrates a second example of the manner in which one may obtain a reading of the wall of lower section 20 in comparison to the thickness of the wall 73 of "T" 70 to get a more accurate comparison of the erosion factor.

FIG. 7 illustrates again, a type of joint which is called a reducer joint 80, wherein fluid is flowing from a larger pipe 20 to a smaller pipe 82 through reducer joint 80. In order to obtain a comparison reading of the two wall thicknesses between the wall of pipe 20 and pipe 82, there is positioned a first scale 50 adjacent the wall of pipe 20 and a second scale 50 adjacent the wall of pipe 82. A rendering of those two wall thicknesses would obtain a comparative reading of the wall thicknesses and the erosion factor that may have occurred within the wall of pipe 82 due to the reduction of the space in which a fluid must confine itself after flowing through reducer joint 80.

Figure 8:
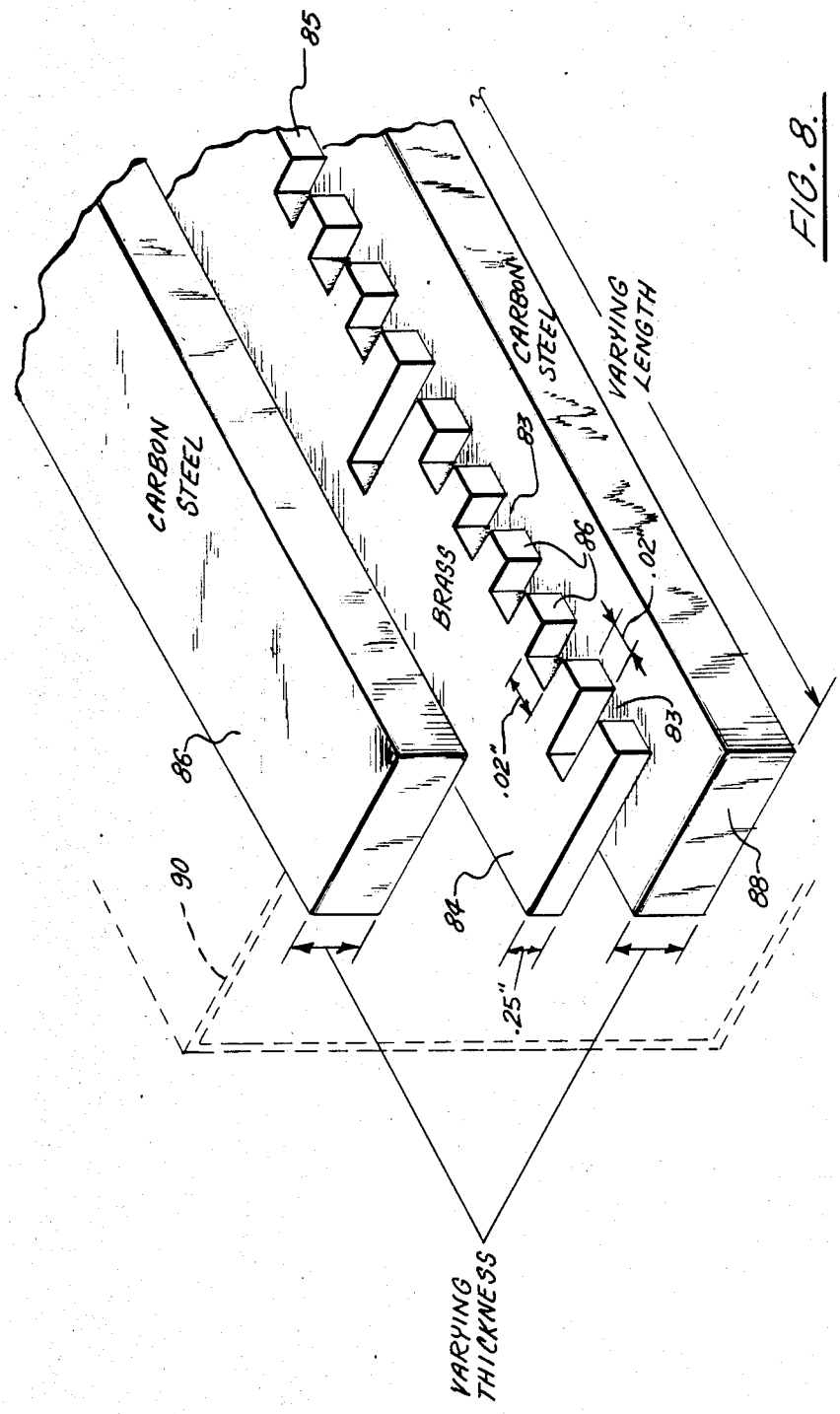
FIG. 8 is an exploded view of the comparative scale of the apparatus of the present invention.

In a proper understanding of the process and apparatus of the present invention, one must understand fully the components involved in comparative scale 50 and the utilization of scale 50 in determining the final wall thickness of the pipe radiographed. This can be best seen in FIGS. 8 and 9 as illustrated. Comparative scale 50, as illustrated in FIG. 8, provides a brass metallic layer 84 which is the actual scale itself. As illustrated, layer 84 would be preferably 0.25 inches in thickness, and along one entire edge 85 of brass layer 84 there would be provided a series of cuts 83 into the body of brass layer 84, each cut representing 0.02 inches in the preferred embodiment, which with a 0.02 inch spacing 86 between each successive cuts. Therefore, for example, should one make this series of cuts over a total length of one inch, each projection 86 or cut 83 would represent 0.02 inches, and would be a known constant factor in the comparative scale 50. In addition to brass layer 84, there is provided an upper carbon steel layer 87 and a lower carbon steel layer 88, which may vary in thickness, but would sandwich brass layer 84 therebetween so as to provide a clear rendering of scale portion 84 on the radiograph. Without the presence of the carbon steel layers, the rendering of the brass scale would be quite difficult and would not give one an accurate representation of the scale. Further, there could be provided a plastic sheath or the like 90, illustrated in partial phantom view, so as to provide a means for maintaining the upper and lower steel layers 87 and 88 in tight confinement against brass layer 84, when scale 50 is being utilized.

Figure 9:
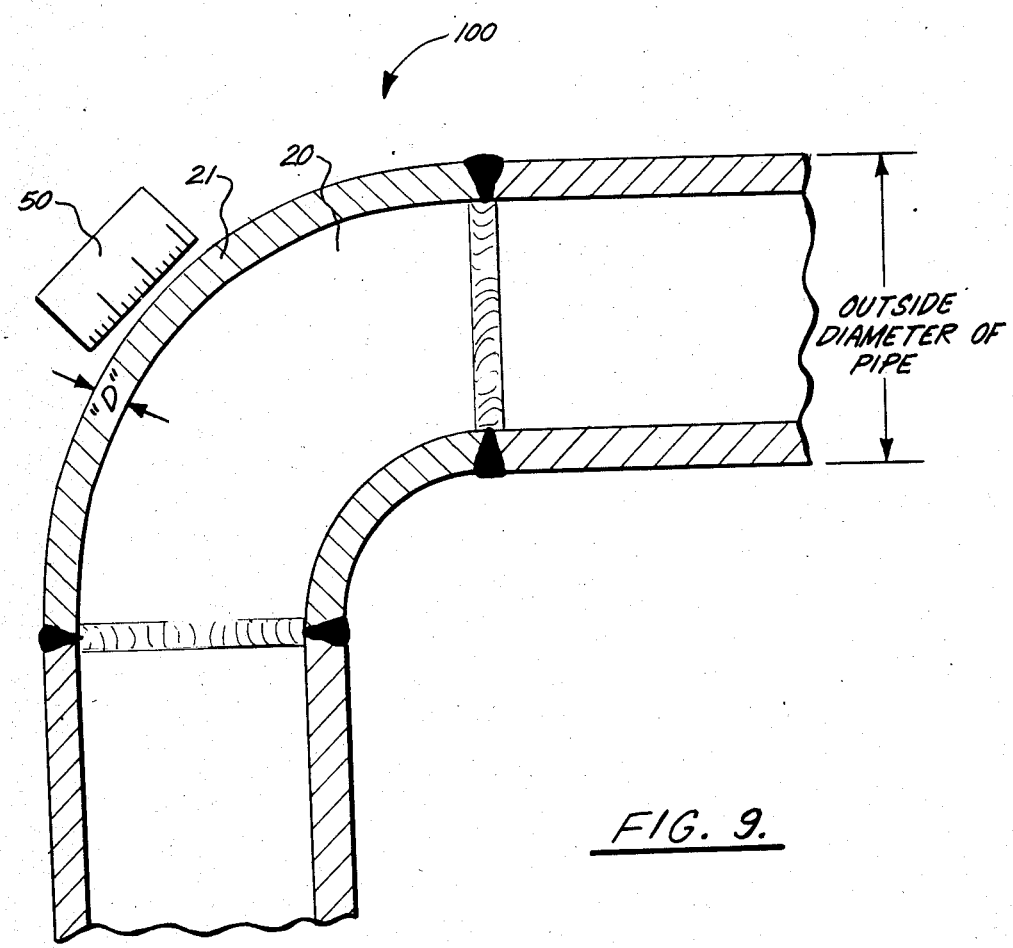
FIG. 9 is a view of the radiograph produced in the process of the present invention.

As was stated earlier, in view of the present state of the art where conversion formulas must be utilized in the present attempts to ascertain the thickness of a wall pipe as graphically seen in an "X" ray, FIG. 9 illustrates the view of such a radiograph and the relative ease at which an accurate reading would be obtained. In FIG. 9 there is illustrated the end product or radiograph 100 illustrating a section of pipe 20 illustrating wall layer 21 adjacent to comparative scale 50. It should be noted that brass scale 84 of scale means 50 is clearly rendered in the radiograph so that the gradations are clearly visible for comparison. As was stated earlier, the object of the radiograph is to give a representation of the wall pipe thickness, so as to determine its relative erosion factor. Therefore, with the use of this radiograph as seen in FIG. 9, one could easily use a caliper or means for pinpointing the thickness "D" as seen in arrows 23, between the outer diameter and inner diameter of the wall 21 as seen in the FIGURE. This thickness measurement would then be placed upon scale 84 of comparative scale 50, and the number of cuts 83 and projections 86 (i.e. gradations) counted between the two markings. Therefore, for example, a count of eight gradations, a simple multiplication of (8×0.02) would then illustrate that the wall thickness is 0.16 inches in diameter in view of the fact that it is being compared against a known factor, i.e., the scale gradations, which are as was illustrated earlier, positioned the exact distance from the X ray as is the point of the wall being X rayed.

And of course, from that, one is able to determine what type of an erosion factor has occurred from the actual thickness that the wall should be when the pipe would be purchased having undergone no use whatsoever.

Because many varying and different embodiments may be made within the scope of the inventive concept herein taught, and because many modifications may be made in the embodiments herein detailed in accordance with the descriptive requirment of the law, it is to be understood that the details herein are to be interpreted as illustrative and not in a limiting sense.

What is claimed as invention is:

1. A method for radiographically inspecting the wall thickness of a section of pipe comprising the step of:
    a. providing a source of radiation;
    b. providing film means;
    c. providing means positioned adjacent the wall of the section of pipe to be inspected, the means further including a plurality of equally spaced cuts of known equal width along at least one edge, each cut being of a width equal to the width of metal between each cut, and defining a graduated measurement scale;
    d. directing a stream of radiation through the wall of the section of pipe and the scale onto the film means;
    e. calipering the thickness of the pipe wall appearing on the film means;
    f. comparing the calipered wall thickness against the number of graduations measured along the scale image recorded on the film means for determining the actual thickness of the pipe wall.

2. The method in claim 1, wherein the source of radiation is preferably gamma radiation.

3. The method in claim 1, wherein the total number of cuts and distances between each cut represent preferably one inch in total distance.

4. The process in claim 1, wherein the scale means is positioned intermediate first and second layers of carbon steel to enhance the rendering of the scale onto the film means.

5. A method for radiographically inspecting the thickness of the wall of a section of pipe against a comparative scale member, comprising the steps of:
    a. providing a source of gamma radiation;
    b. providing film means;
    c. providing the scale member positioned adjacent the wall of the section of pipe to be radiographically inspected, the scale member further including equally spaced apart cuts along at least one edge of the scale member, each of the cuts being spaced apart a known width equal to the width of the cut;
    d. directing a stream of gamma radiation through the wall of the section of pipe and the scale member positioned adjacent thereto;
    e. recording the image onto the film means;
    f. calipering the thickness of the image of the pipe wall that appears on the film means; and
    g. comparing the calipered thickness against the measured cuts in scale member, so that the total number of measured cuts within the calipered thickness represents the thickness of the pipe wall.

6. The process in claim 5, wherein the measured cuts on the scale member perferably measures 0.02 inches in width and are perferably 0.02 inches spaced apart from one another.

7. An apparatus, utilized in combination with a process for radiographically inspecting the wall thickness of a section of pipe by positioning the apparatus adjacent the wall of the section of pipe as the section of pipe is radiographically inspected, and comparing a calipered thickness that appears on the radiograph against the apparatus, for determining the actual thickness of the pipe wall, the apparatus comprising:
    a. a metallic member having a plurality of cuts along at least one edge of the member positioned nearest to the wall section of pipe being radiographically photographed, each of the cuts in the edge of the member being of equal known distance apart and being of equal known width, so that when the calipered thickness of the pipe wall image is measured and compared against the edge of the member, an actual thickness of the pipe can be determined therefrom; and
    b. means positioned intermediate the source of radiation and the metallic member for enhancing clarity of the metallic member on the film means when it is radiographically recorded.

8. The apparatus in claim 7, wherein the means positioned intermediate the radiation source and the metallic member further comprises a layer of carbon steel.

9. The apparatus in claim 7, wherein each of said cuts is measured at 0.02 inches in width and are spaced apart by 0.02 inches.

10. The apparatus in claim 7, wherein the metallic member is brass.

* * * * *